US008327884B2

(12) United States Patent
Nishimine et al.

(10) Patent No.: US 8,327,884 B2
(45) Date of Patent: Dec. 11, 2012

(54) REGULATOR VALVE

(75) Inventors: Akiko Nishimine, Toyota (JP); Shinichi Ito, Anjo (JP); Kenichi Tsuchida, Hazu-gun (JP)

(73) Assignees: Toyota Jidosha Kabushiki Kaisha, Aichi-Ken (JP); Aisin AW Co., Ltd., Aichi-Ken (JP)

( * ) Notice: Subject to any disclaimer, the term of this patent is extended or adjusted under 35 U.S.C. 154(b) by 523 days.

(21) Appl. No.: 12/597,646

(22) PCT Filed: Apr. 25, 2008

(86) PCT No.: PCT/IB2008/001024
§ 371 (c)(1),
(2), (4) Date: Oct. 26, 2009

(87) PCT Pub. No.: WO2008/132587
PCT Pub. Date: Nov. 6, 2008

(65) Prior Publication Data
US 2010/0327206 A1    Dec. 30, 2010

(30) Foreign Application Priority Data
Apr. 26, 2007   (JP) ................... 2007-116364

(51) Int. Cl.
*F16K 11/07*    (2006.01)
(52) U.S. Cl. .............. 137/625.66; 137/111; 137/118.02; 137/118.07; 137/625.69
(58) Field of Classification Search ............ 137/625.66, 137/625.25, 625.69, 625.67, 118.01, 118.02, 137/102, 111, 118.07
See application file for complete search history.

(56) References Cited

U.S. PATENT DOCUMENTS

| 3,053,051 | A | * | 9/1962 | Kelley ............................ 60/329 |
| 4,023,444 | A | * | 5/1977 | Murakami ..................... 477/151 |
| 4,287,906 | A | * | 9/1981 | Green et al. ............. 137/118.02 |
| 4,563,918 | A |   | 1/1986 | Sugano |

(Continued)

FOREIGN PATENT DOCUMENTS

JP    05-099302 A    4/1993

(Continued)

OTHER PUBLICATIONS

German Office Action for corresponding German Patent Application No. 11 2008 001 124.9 issued on Nov. 24, 2010.

*Primary Examiner* — Craig Schneider
*Assistant Examiner* — Jessica Cahill
(74) *Attorney, Agent, or Firm* — Sughrue Mion, PLLC

(57) ABSTRACT

A regulator valve is structured such that hydraulic pressure to be output from a regulated pressure output port is regulated according to urging forces, i.e., line pressure to be regulated, throttle pressure, spring force from a compression coil spring, and operating force from a plunger, which are applied to a valve spool. The plunger has a small diameter portion and a large diameter portion having a diameter larger than the diameter of the small diameter portion, both of which are axially displaceably retained in a spring receiving sleeve. The small diameter portion is urged in one axial direction at one end of the plunger that protrudes into a spring chamber and faces the valve spool, while the large diameter portion is urged in the other axial direction by range pressure at the other end of the plunger which is isolated from the small diameter portion located in the spring chamber.

12 Claims, 4 Drawing Sheets

U.S. PATENT DOCUMENTS

| | | | |
|---|---|---|---|
| 5,323,668 A * | 6/1994 | Nakagawa et al. | 477/163 |
| 5,924,450 A * | 7/1999 | Sakakibara et al. | 137/625.66 |
| 6,024,200 A * | 2/2000 | Jang | 192/85.01 |
| 6,463,959 B2 * | 10/2002 | Kremer | 137/625.66 |
| 6,695,737 B2 | 2/2004 | Park et al. | |
| 7,117,881 B2 * | 10/2006 | Muller | 137/118.07 |
| 2004/0089355 A1 * | 5/2004 | Nirasawa et al. | 137/625.69 |
| 2006/0207655 A1 | 9/2006 | Xiang et al. | |

FOREIGN PATENT DOCUMENTS

| | | |
|---|---|---|
| JP | 05-157174 A | 6/1993 |
| JP | 09-079361 A | 3/1997 |
| JP | 3087326 B1 | 7/2000 |
| JP | 2006-153238 A | 6/2006 |

\* cited by examiner

REGULATOR VALVE

BACKGROUND OF THE INVENTION

1. Field of the Invention

The invention relates to a regulator valve provided in a hydraulic control apparatus of an automatic transmission. More particularly, the invention relates to a regulator valve suitable for use as a primary regulator valve that controls line pressure.

2. Description of the Related Art

A hydraulic control apparatus that controls a vehicular automatic transmission is provided with a plurality of valves in a valve body mounted to a shift mechanism. This hydraulic control apparatus controls a plurality of friction apply elements in the transmission by regulating the hydraulic pressure and switching the supply and discharge path of hydraulic fluid discharged from an oil pump, using these valves. One of the valves provided is a regulator valve which controls the line pressure which is the base for the apply pressure of the individual friction apply elements in the automatic transmission. This regulator valve is provided to regulate the pressure of the hydraulic fluid discharged from the oil pump according to the vehicle speed, the throttle opening amount, and the like.

Typically in this regulator valve, a valve spool that appropriately connects a supply pressure port to which line pressure is supplied with a drain port is urged to one side in the axial direction by line pressure to be regulated being applied from one end, and is urged to the other side in the axial direction by urging force corresponding to a coil spring which is interposed between the valve body and the valve spool at the other end, and throttle pressure that is generated according to engine output.

Japanese Patent No. 3087326, Japanese Patent Application Publication No. 2006-153238 (JP-A-2006-153238), and Japanese Patent Application Publication No. 5-99302 (JP-A-5-99302), for example, describe regulator valves that regulate the line pressure PL in the following manner. FIG. 3 shows a specific example of this type of regulator valve. As shown in FIG. 3, a coil spring 32 and a spring receiving sleeve 34 are provided inside a valve chamber 33 of a valve body 31. This spring receiving sleeve 34 axially displaceably houses a straight plunger 36, one end of which faces a valve spool 35 and the other end of which receives reverse range pressure PL(R). As a result, both throttle pressure PSLT and operating force corresponding to the reverse range pressure PL(R) from the straight plunger 36 are applied to the valve spool 35 when the reverse range is selected.

In addition, Japanese Patent Application Publication No. 5-157174 (JP-A-5-157174), for example, describes another such regulator valve, an example of which is shown in FIG. 4. With this kind of regulator valve, a stepped plunger 46 having two lands 46a and 46b with different diameters is housed inside a spring receiving portion 44. The large diameter land 46a is provided on the side of the stepped plunger 46 that is closest to a spool 45. Reverse range pressure PL(R) is applied between these two lands 46a and 46b, while throttle pressure PSLT is applied to the back side of the small diameter land 46b.

Incidentally, reference characters A1 and A2 in FIG. 3 and reference character A1 in FIG. 4 denote the land portion pressure receiving areas of both ends of each of the valve spools 35 and 45, respectively. Similarly, reference character A3 in FIG. 3 and reference characters A3 and A4 in FIG. 4 denote the land portion pressure receiving areas of both ends of each of the plungers 36 and 46, respectively.

Also, Japanese Patent Application Publication No. 9-79361 (JP-A-9-79361), for example, describes another regulator valve in which throttle pressure is applied between large and small lands of a stepped plunger, while throttle pressure, not reverse range pressure PL(R) is also applied to the back side of the large diameter land, which is the side of the land farthest from a valve spool for regulating the line pressure.

However, with the regulator valve of the related art such as that described above, force which acts on the valve spools 35 and 45 but which does not appear in a pressure regulating expression, such as flow force or the like, may cause the line pressure to increase beyond the pressure for which the regulator valve was designed (i.e., beyond the designed value). That is, a so-called rising amount may increase.

One effective measure to prevent this is to increase the feedback effective pressure receiving area (which corresponds to A1-A3 for the straight plunger 36 and A1-(A3-A4) for the stepped plunger 46, for example). However, if the pressure receiving area A3 of the plungers 36 and 46 of the related art is reduced, the gain of the throttle pressure PSLT will also simultaneously decrease. As a result, the necessary conditions for regulating the line pressure will no longer be satisfied.

That is, with a straight plunger such as the plunger 36, if the pressure receiving area A3 of the plunger 36 is reduced, the valve gain of the throttle pressure PSLT will decrease, and as a result, the necessary line pressure when the throttle is fully open will not be able to be achieved.

Also, with the stepped plunger of the related art, the plunger moves even in the drive range so the only way to increase the feedback effective pressure receiving area without changing the pressure receiving area A3 which affects the drive range pressure setting is to increase the pressure receiving area A4. As a result, however, the gain of the throttle pressure decreases such that the necessary line pressure when the throttle is fully open is unable to be achieved. Furthermore, because the plunger 46 moves even in the drive range, the stability of the hydraulic control may decline. In addition, the plunger 46 is not easy to be assembled.

Moreover, with both of the regulator valves of the related art, the decrease in the gain of the throttle pressure can be compensated for by increasing the throttle pressure receiving area on the valve spool 35 and 45 side. Doing this, however, would increase the size of the valve, which means that the valve would require more mounting space.

For these reasons, it is difficult for the regulator valves of the related art to ensure both feedback effective pressure receiving area and the necessary line pressure, while fitting into a limited space.

SUMMARY OF THE INVENTION

This invention thus provides a regulator valve capable of ensuring both feedback effective pressure receiving area and the necessary line pressure, while fitting into a limited valve mounting space.

(1) A first aspect of the invention relates to a regulator valve which constitutes a portion of a hydraulic control apparatus of an automatic transmission. This regulator valve includes a valve body having a valve chamber and a plurality of ports; a valve spool which is axially displaceably housed in the valve chamber; a coil spring which is housed in the valve chamber in such a manner as to be interposed between the valve body and the valve spool; and a plunger which is displaceably housed in the valve body, a first end side of the plunger defining a spring chamber that houses the coil spring between the plunger and the valve spool, and a second end side of the plunger receiving a range signal pressure through one of the plurality of ports. In this regulator valve, the hydraulic pressure discharged from one of the plurality of ports is regulated according to the displacement of the valve spool from the valve spool being urged to a first side in the axial direction by hydraulic pressure to be regulated that is received through one of the plurality of ports, and being urged to a second side in the axial direction by a combination of i) throttle pressure from one of the ports that is connected to the spring chamber, ii) spring force from the coil spring corresponding to the displacement of the valve spool, and iii) operating force of the plunger corresponding to the throttle pressure and the range signal pressure. Moreover, the plunger has a small diameter portion and a large diameter portion which has a diameter larger than the diameter of the small diameter portion, both of which are axially displaceably retained in the valve body. The small diameter portion is urged to the first side in the axial direction at a first end side which faces the valve spool, and the large diameter portion is urged to the second side in the axial direction by the range signal pressure at a second end side which is isolated from the small diameter portion located in the spring chamber.

According to this structure, the pressure receiving area of the plunger that receives the range signal pressure and the pressure receiving area o the plunger that receives the throttle pressure can be set separately. Therefore, the feedback effective pressure receiving area for the line pressure can be increased by making the pressure receiving area of the large diameter portion of the plunger that receives the range signal pressure smaller than the pressure receiving area of the valve spool that receives the feedback line pressure. As a result, the rising amount can be reduced. Also, the effective pressure receiving area of the small diameter portion of the plunger that receives the throttle pressure can be increased by reducing the pressure receiving area of the small portion of the plunger that receives the throttle pressure. This makes it possible to ensure the required valve gain of the throttle pressure, and thus ensure the necessary line pressure.

(2) In the regulator valve described in (1) above, the plurality of ports of the valve body may include a feedback pressure port, a supply pressure port, a drain port, and a regulated pressure output port, as well as a throttle pressure port to which the throttle pressure is supplied, and a range signal pressure port to which the range signal pressure is supplied. Also, the valve spool may be displaced in the axial direction to selectively connect the supply pressure port with the regulated pressure output port and the drain port by being urged to the one side in the axial direction by the hydraulic pressure to be regulated that is received through the feedback pressure port at a first end side, and being urged to the second side in the axial direction by receiving, at a second end side, the combination of i) the throttle pressure inside the spring chamber, ii) the spring force from the coil spring corresponding to the displacement of the valve spool, and iii) the operating force of the plunger corresponding to the throttle pressure and the range signal pressure. Accordingly, the valve structure is simplified.

(3) In the regulator valve described in (2) above, the valve spool may have a first land portion that receives the hydraulic pressure to be regulated. Also, a pressure receiving area of the large diameter portion of the plunger that receives the range signal pressure may be smaller than the pressure receiving area of the first land portion that receives the hydraulic pressure to be regulated. This structure increases the feedback effective pressure receiving area for the line pressure, thereby enabling the rising amount of the hydraulic pressure to be regulated, which is caused by flow force or the like, from decreasing.

(4) Also, in the regulator valve described in (1) to (3) above, the valve spool may have a second land portion that receives the throttle pressure in the spring chamber. Also, the pressure receiving area of the small diameter portion of the plunger that receives the throttle pressure may be smaller than the pressure receiving area of the second land portion that receives the throttle pressure. This structure increases the effective pressure receiving area for the throttle pressure, thereby ensuring the gain of the throttle pressure, which enables the necessary line pressure to be ensured.

(5) The regulator valve described in any one of (1) to (4) above may also include a sleeve-shaped spring receiving member that is housed inside the spring chamber in such a manner as to be interposed between the coil spring and the valve body. Moreover, the spring receiving member may be formed of a first inside diameter portion that axially displaceably retains the small diameter portion of the plunger, and a second inside diameter portion that axially displaceably supports the large diameter portion of the plunger. Further, a drain passage which opens into a space between the spring receiving member and the plunger may be formed between the first inside diameter portion and the second inside diameter portion.

In this case, the large diameter portion of the plunger is inside the spring receiving member and the small diameter portion of the plunger is retained by the spring receiving member. As a result, the plunger and the spring receiving member can be vertically fit into the valve body with the plunger already having been fit into the spring receiving member, which also facilies automation of the assembly of a hydraulic control apparatus of an automatic transmission.

This aspect of the invention makes it possible to provide a regulator valve in which i) a stepped plunger is structured such that the pressure receiving area of the plunger that receives the reverse range pressure and the pressure receiving area of the plunger that receives the throttle pressure are able to be set separately, and ii) the pressure receiving area for the range signal pressure is made smaller than the pressure receiving area of the valve spool that receives the feedback line pressure, while the pressure receiving area for the throttle pressure is reduced. Accordingly, the rising amount of the hydraulic pressure that is to be regulated can be reduced by increasing the feedback effective pressure receiving area for the line pressure. This makes it possible to ensure the required valve gain of the throttle pressure, which in turn makes it possible to ensure the necessary line pressure. In addition, it is possible to provide a regulator valve that can also contribute to automation of the assembly of a hydraulic control apparatus of an automatic transmission by having the plunger and the spring receiving member able to be vertically fit into the valve body with the plunger already having been fit into the spring receiving member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, example embodiments of the invention will be described with reference to the accompanying drawings.

Figure 1:
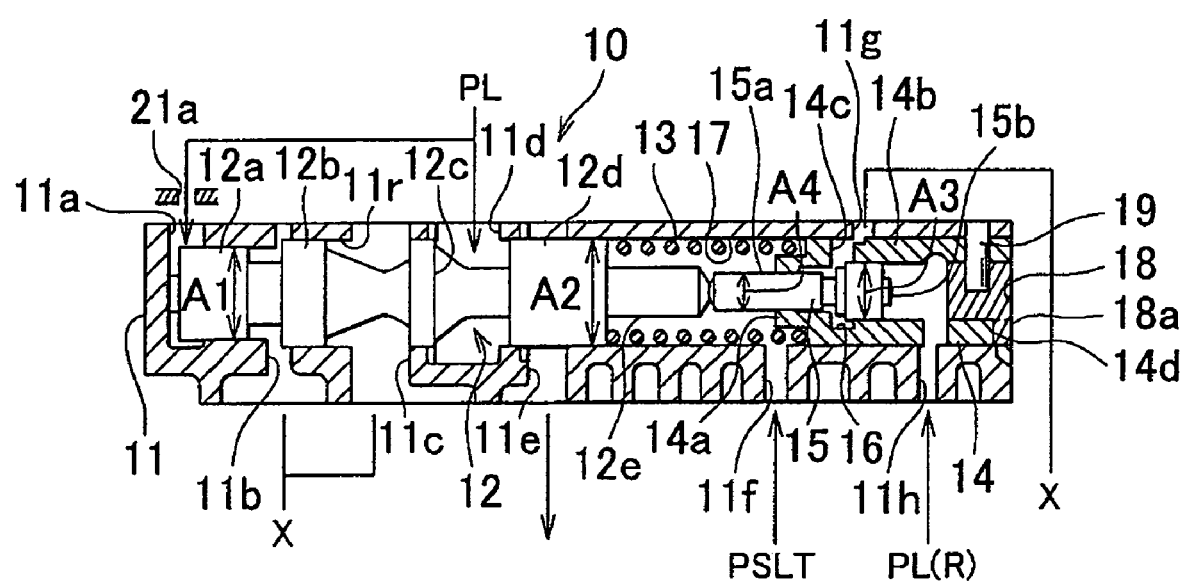
FIG. 1 is a sectional view of a body of a regulator valve according to a first example embodiment of the invention.
Figure 2:
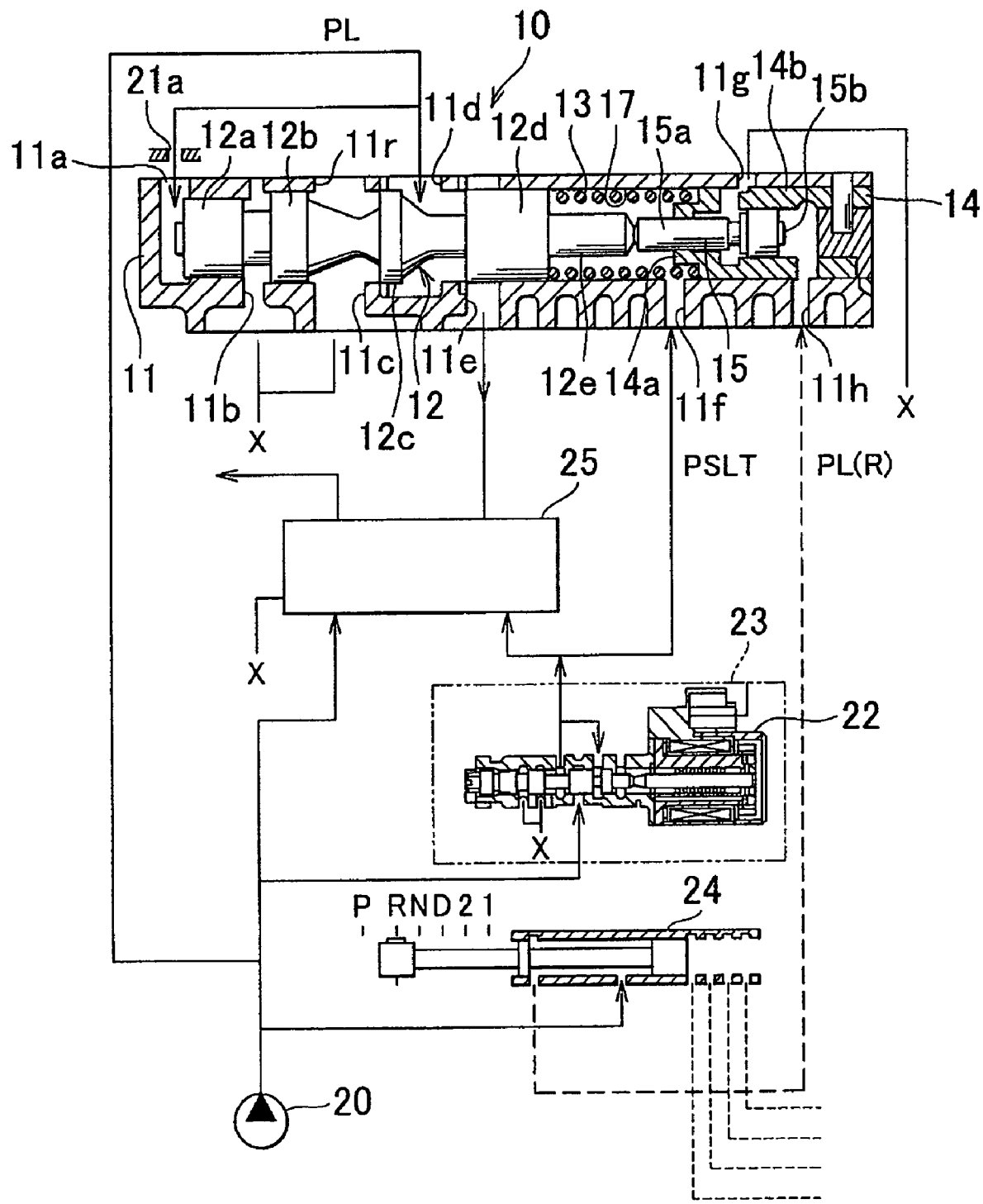
FIG. 2 is a block diagram schematically showing a portion of a hydraulic control apparatus that includes a device which supplies hydraulic pressure to the regulator valve of the first example embodiment of the invention.
Figure 3:
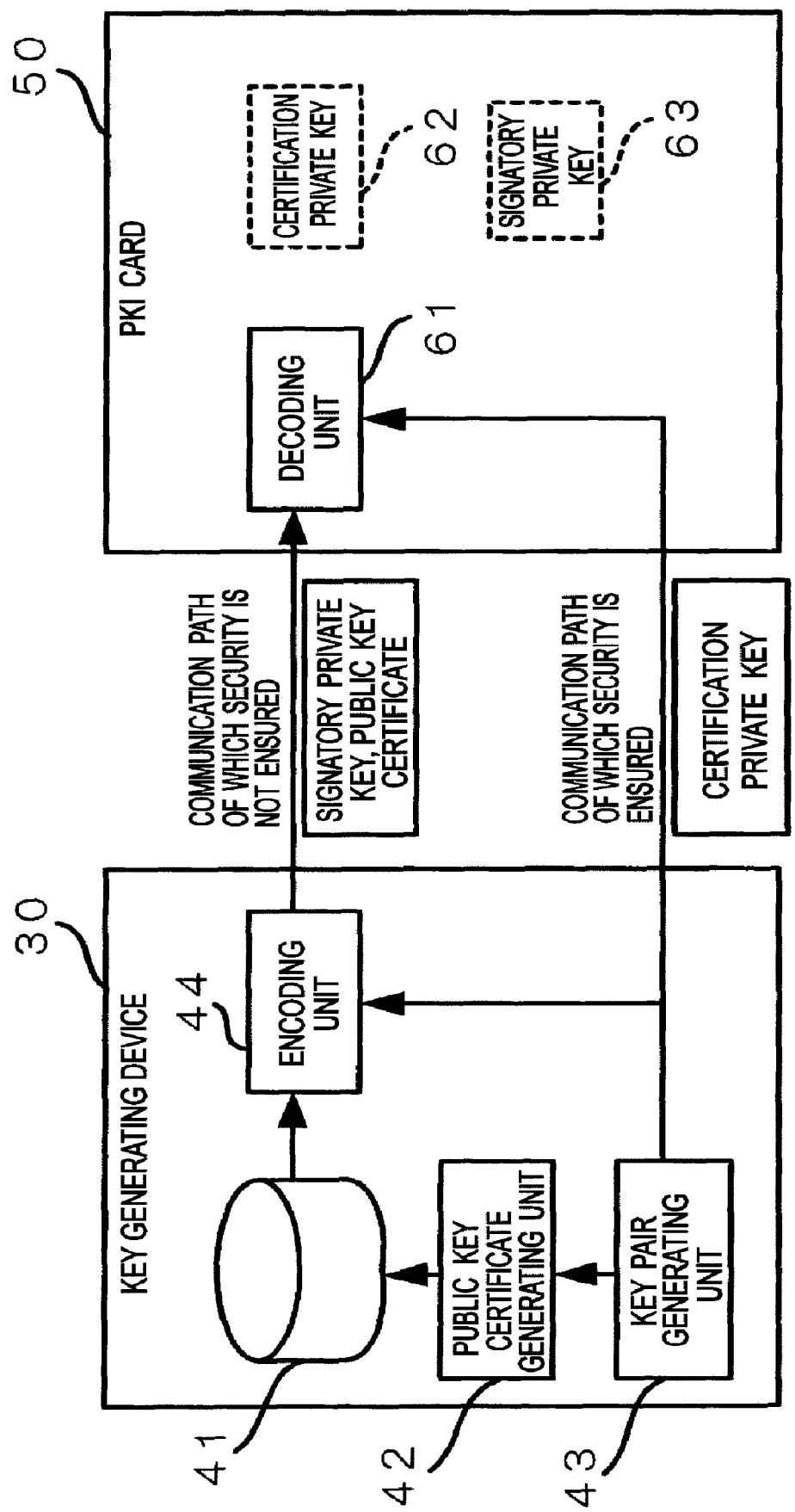
FIG. 3 is a sectional view of a body of a regulator valve according to a first example of related art.
Figure 4:
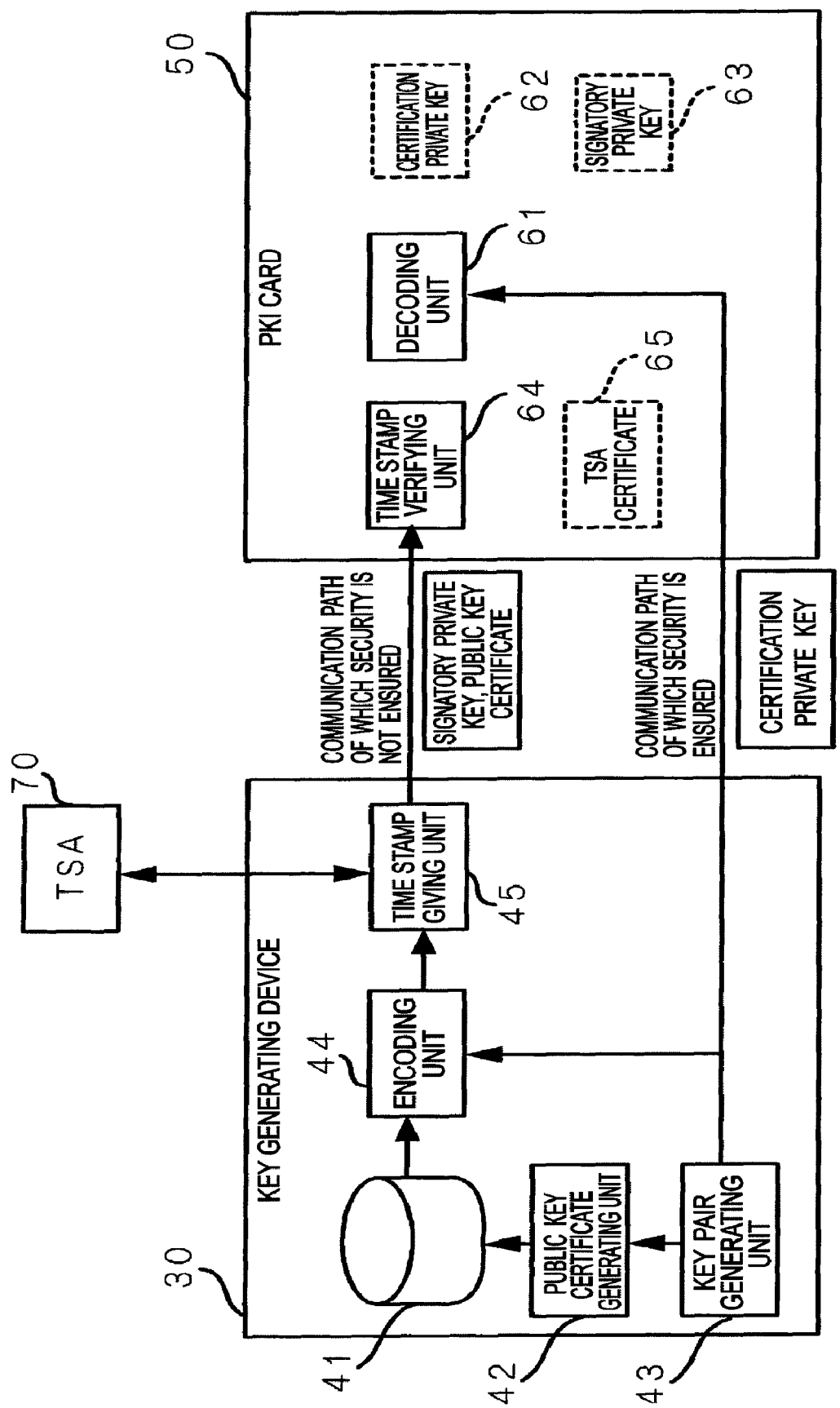
FIG. 4 is a sectional view of a body of a regulator valve according to a second example of related art.

FIG. 1 is a sectional view of a body of a regulator valve according to a first example embodiment of the invention, and shows an example in which the invention has been applied to a primary regulator valve that constitutes part of a hydraulic control apparatus of a stepped automatic transmission. Also, FIG. 2 is a block diagram schematically showing a portion of the hydraulic control apparatus that includes a device which supplies hydraulic pressure to the regulator valve of this example embodiment.

First the structure of the regulator valve will be described. As shown in FIG. 1, the regulator valve 10 according to this example embodiment includes a valve body 11, a valve spool 12, and a compression coil spring 13. The valve body 11 has a cylindrical valve chamber 11r which is closed-off at one end and a plurality of ports 11a, 11b, 11c, 11d, 11e, 11f, 11g, and 11h which are all connected to this valve chamber 11r. The valve spool 12 is housed in the valve chamber 11r in such a manner that it can slide displaceably in the axial direction. The compression coil spring 13 is housed inside the valve chamber 11r in a position interposed between the valve body 11 and the valve spool 12.

The regulator valve 10 also includes a spring receiving sleeve 14 (i.e., a sleeve-shaped spring receiving member) and a plunger 15. The spring receiving sleeve 14 is housed inside the valve chamber 11r in a position interposed between the compression coil spring 13 and the valve body 11. The plunger 15 is housed inside the spring receiving sleeve 14 in a manner such that it is able to displaceably slide. One end of this plunger 15 defines a spring chamber 17 which houses the coil spring 13 between the plunger 15 and the valve spool 12. The other end of the plunger 15 receives reverse range pressure PL(R) (i.e., range signal pressure) through the port 11h, from among the plurality of ports 11a to 11h.

More specifically, the plurality of ports 11a to 11h of the valve body 11 include a feedback pressure port 11a, a supply pressure port 11d, a drain port 11c, and a regulated pressure output port 11e, as well as a throttle pressure port 11f to which throttle pressure PSLT is supplied, a drain port 11g, and a reverse range pressure port 11h to which reverse range pressure PL(R) is supplied.

The valve spring 12 has a first land portion 12a which receives line pressure PL, which is the hydraulic pressure to be regulated by the regulator valve 10, through the feedback pressure port 11a. The valve spool 12 is urged to the tight in FIG. 1 (i.e., to one side in the axial direction) by pressure corresponding to the line pressure PL that is fed back and the pressure receiving area A1 of the first land portion 12a that receives that line pressure PL.

Further, the valve spool 12 has a second land portion 12d that receives throttle pressure PSLT, which will be described later, which is supplied into the spring chamber 17. One end of the compression coil spring 13 is engaged with this second land portion 12d. As a result, the valve spool 12 is urged to the left in FIG. 1 (i.e., to the other side in the axial direction) by a combination of i) the pressure corresponding to the throttle pressure PSLT and the pressure receiving area A2 of the second land portion 12d that receives that throttle pressure PSLT, ii) spring force (acting to the left in FIG. 1) from the compression coil spring 13 corresponding to the displacement of the valve spool 12 (hereinafter, this spring force may also be referred to as "Fsp"), and iii) the operating force of the plunger 15 that receives the throttle pressure PSLT and the reverse range pressure PL(R).

The valve spool 12 thus regulates the hydraulic pressure to be output from the regulated pressure output port 11e by being axially displaced according to these urging forces to one side and the other side in the axial direction, so as to selectively connect the supply pressure port 11d with the regulated pressure output port 11e or the drain port 11c.

Meanwhile, the plunger 15 is formed of a small diameter portion 15a and a large diameter portion 15b that has a larger diameter than the diameter of the small diameter portion 15a. Both the small diameter portion 15a and the large diameter portion 15b are retained by the spring receiving sleeve 14 in a manner such that they are slidingly displaceable in the axial direction. The small diameter portion 15a is urged to one side (i.e., the right side in FIG. 1) in the axial direction at one end (i.e., the left end in FIG. 1) of the plunger 15 that protrudes into the spring chamber 17 and faces one end portion 12e of the valve spool 12. The large diameter portion 15b is urged to the other side (i.e., the left side in FIG. 1) in the axial direction by reverse range pressure PL(R) from the reverse range pressure port 11h at the other end (i.e., the right end in FIG. 1) of the plunger 15 which is isolated from the small diameter portion 15a located in the spring chamber 17.

Here, the pressure receiving area A3 of the large diameter portion 15b of the plunger 15 that receives the reverse range pressure PL(R) is made to be comparatively smaller than the pressure receiving area A1 of the first land portion 12a of the valve spool 12 that receives the feedback line pressure PL.

Also, the pressure receiving area A4 of the small diameter portion 15a of the plunger 15 that receives the throttle pressure PSLT is made to be comparatively smaller than the pressure receiving area A2 of the second land portion 12d of the valve spool 12 that receives the throttle pressure PSLT.

Furthermore, the pressure receiving area A2 of the second land portion 12d of the valve spool 12 that receives the throttle pressure PSLT is made to be larger than the pressure receiving area A1 of the first land portion 12a of the valve spool 12 that receives the feedback line pressure PL. That is, the pressure receiving area A3 of the large diameter portion 15b of the plunger 15 that receives the reverse range pressure PL(R) is larger than the pressure receiving area A4 of the small diameter portion 15a of the plunger 15 that receives the throttle pressure PSLT but smaller than the pressure receiving area A1 of the first land portion 12a of the valve spool 12 that receives the feedback line pressure PL. Hence, the relationship in size among the pressure receiving areas A1 to A4 is A2 >A1 >A3 >A4.

The valve spool 12 also has intermediate land portions 12b and 12c. The land portion 12c connects the supply pressure port 11d with the drain port 11e when the valve spool 12 moves a predetermined amount to the right in FIG. 1.

Meanwhile, the spring receiving sleeve 14 is a stepped cylinder which is closed-off at one end, formed of a first inside diameter portion 14a and a second inside diameter portion 14b. The first inside diameter portion 14a axially displaceably retains the small diameter portion 15a of the plunger 15, while the second inside diameter portion 14b axially displaceably supports the large diameter portion 15b of the plunger 15. Also, between the first inside diameter portion 14a and the second inside diameter portion 14b of the spring receiving sleeve 14 is formed a drain passage 14c that opens into an annular space 16 between the spring receiving sleeve 14 and the plunger 15. Moreover, a notch portion 14d cut out to the right in FIG. 1 is formed in the rear end of the second inside diameter portion 14b of the spring receiving sleeve 14. The open end side of the spring receiving sleeve 14 is sealed so that it is liquid tight by a plug 18 having a protrusion 18a that fits into this notch portion 14d. Then the spring receiving sleeve 14 and the plug 18 are integrally fixed to the valve body 11 so that they will not slip out by a retaining pin 19 that passes through the valve body 11 and the spring receiving sleeve 14 and sticks into the plug 18 in a direction perpendicular to their axes.

As shown in FIG. 2, the line pressure PL which serves as the feedback pressure is the pressure at which hydraulic fluid discharged from the oil pump 20 provided in the automatic transmission is supplied to the feedback pressure port 11a via an orifice 21a and an orifice which is not shown but is provided upstream of that orifice 21a. Also, the throttle pressure PSLT is regulated to a pressure corresponding to the engine output torque by a throttle pressure regulating device 23 which includes a linear solenoid valve 22, for example, and then supplied to the throttle pressure port 11f. Moreover, the reverse range pressure PL(R) is supplied from a manual valve 24 when the reverse range (R) is selected, according to the switching position of the manual valve 24 which operates in response to a range selection operation by a driver. Also, output pressure that is output from the regulated pressure output port 11e is supplied to a secondary regulator valve 25 where converter pressure and lubrication oil pressure suitable for the vehicle speed and engine output are further regulated based on the throttle pressure PSLT. Incidentally, when the forward range (see ranges D, 1 and 2 of the manual valve 24 in FIG. 2) is selected, hydraulic pressure is supplied and discharged via shift valves and an accumulator and the like, none of which are shown, to operate friction apply elements corresponding to the appropriate gears. This is well known and so will not be described in detail here.

Next, assembly of the regulator valve according to this example embodiment will be described.

First, the stepped plunger 15 is inserted into the spring receiving sleeve 14 from the small diameter portion 15a side. Then the protrusion 18a of the plug 18 is fit into the notch portion 14d of the spring receiving sleeve 14 such that the open end side of the spring receiving sleeve 14 is sealed off by the plug 18.

Meanwhile, the valve spool 12 is inserted into the valve chamber 11r of the valve body 11 that has been oriented upright with a jig or the like for assembly. Then the compression coil spring 13 is inserted lengthwise into the valve chamber 11r of the valve body 11.

Next, an assembly of the spring receiving sleeve 14 which houses the plunger 15 and which has been sealed by the plug 18 is set into the valve body 11 with the small diameter portion 15a of the plunger 15 facing downward.

At this time, the assembly of the spring receiving sleeve 14 is fit into the valve chamber 11r of the valve body 11 while compressing the compression coil spring 13 that is already housed in the valve chamber 11r. Also, the spring receiving sleeve 14 is roughly positioned in a predetermined position in the roional direction with respect to the valve body 11 by the notch portion 14d of the spring receiving sleeve 14 and the protrusion 18a of the plug 18.

Next, the spring receiving sleeve 14 and the plug 18 are integrally fixed to the valve body 11 so as not to slip out by inserting the retaining pin 19 through the valve body 11 and the spring receiving sleeve 14 and into a notch portion of the plug 18.

Next, the operation of the regulator valve will be described.

With a hydraulic control apparatus of an automatic transmission provided with a regulator valve such as the regulator valve 10 described above, when the engine speed increases in the forward range, and as a result, the speed of the oil pump 20 increases, for example, the line pressure PL increases, and as it does so, it tries to push the valve spool 12 to the right in FIG. 1. However, as the engine output increases, so too does the throttle pressure, which tries to push the valve spool 12 to the left in FIG. 1, thus enabling the displacement amount of the valve spool 12 to be appropriately adjusted. Incidentally, at this time reverse range pressure PL(R) is not supplied so the plunger 15 is kept in the rightmost position by the throttle pressure PSLT.

On the other hand, when the reverse range is selected by a range switching operation, reverse range pressure PL(R) is supplied from the manual valve 24. Incidentally, the reverse range pressure is the line pressure PL that is supplied via the manual valve 24, as shown in FIG. 2.

At this time, the reverse range pressure PL(R) is applied to the large diameter portion 15b of the plunger 15, causing the plunger 15 to move to the left. As a result, not only the throttle pressure PSLT but also the operating force of the plunger 15 acts on the valve spool 12. In this se, the line pressure PL when the reverse range is selected is regulated.

The pressure regulating expression for the reverse range of the regulator valve 10 in this se can be expressed by Expression (1) below.

$$PL = \frac{A2 - A4}{A1 - A3} PSLT + \frac{Fsp}{A1 - A3} \quad (1)$$

where A1 is the pressure receiving area of the valve spool that receives feedback pressure; A2 is the pressure receiving area of the valve spool that receives throttle pressure; A3 is the pressure receiving area of the plunger that receives reverse range pressure; A4 is the pressure receiving area of the plunger that receives throttle pressure; and Fsp is the spring force of the compression coil spring.

In this example embodiment, the pressure receiving area A3 of the stepped plunger 15 that receives the reverse range pressure PL(R) and the pressure receiving area A4 of the stepped plunger 15 that receives the throttle pressure PSLT can be set separately, so the pressure receiving area A3 of the stepped plunger 15 that receives the reverse range pressure PL(R) is made comparatively smaller than the pressure receiving area A1 of the valve spool 12 that receives the feedback line pressure PL, while the effective pressure receiving area (A2-A4) is increased. Therefore, the feedback effective pressure receiving area (A1-A3) for the line pressure PL in Expression (1) above can be increased so even if flow force Ff that is not expressed in the pressure regulating expression is generated at the regulated pressure output port 11e or the like, the effect corresponding to Ff/(A1-A3) can be suppressed which enables the rising amount of the line pressure to be reduced.

Also, the diameter of the small diameter portion 15a of the plunger 15 is reduced such that the effective pressure receiving area (A2-A4) for the throttle pressure PSLT is made larger. As a result, a decrease in the gain of the throttle pressure PSLT can be prevented, making it possible to ensure the necessary line pressure at times such as when the throttle is fully open.

Furthermore, the large diameter portion 15b of the plunger 15 is inside the spring receiving sleeve 14 and the small diameter portion 15a of the plunger 15 is retained by the spring receiving sleeve 14. That is, the inside diameter of the first inside diameter portion 14a of the spring receiving sleeve 14 is smaller than the inside diameter of the large diameter portion 15b of the plunger 15, so the plunger 15 and the spring receiving portion 14 can be fit vertically into the valve body 11 with the plunger 15 already having been fit into the spring receiving portion 14. This facilies automation of the assembly of a hydraulic control apparatus of an automatic transmission. That is, with the straight spool of the related art, or the stepped plunger of the related art in which the valve spool side has a large diameter, it is necessary to prevent the plunger from slipping out of the spring receiving sleeve. With the regulator valve 10 according to this example embodiment, however, this will not happen so there is no need to prevent it.

Also, with this example embodiment, the feedback pressure is applied to one end of the valve spool 12, while the throttle pressure, the spring force from the compression coil spring 13, and the operating force of the plunger 15 are applied to the other end of the valve spool 12, so the structure is simplified.

In this way, according to the regulator valve of this example embodiment, the stepped plunger is structured such that the pressure receiving area A3 of the plunger 15 that receives the reverse range pressure PL(R) and the pressure receiving area A4 of the plunger 15 that receives the throttle pressure PSLT are able to be set separately, so the pressure receiving area A3 of the plunger 15 that receives the reverse range pressure PL(R) is made smaller than the pressure receiving area A1 of the valve spool 12 that receives the feedback line pressure PL, while the effective pressure receiving area (A2-A4) for the throttle pressure PSLT is increased. Therefore, the rising amount of the hydraulic pressure that is to be regulated can be reduced by increasing the feedback effective pressure receiving area (A1-A3) for the line pressure. This makes it possible to prevent the gain of the throttle pressure PSLT from decreasing, which in turn makes it possible to ensure the necessary line pressure. As a result, both the feedback effective pressure receiving area (A1-A3) and the necessary line pressure can be ensured within a limited valve mounting space. In addition, it is possible to provide a regulator valve that can contribute to the automation of the assembly of a hydraulic control apparatus of an automatic transmission by having the plunger and the spring receiving sleeve 14 able to be vertically fit into the valve body 11 with the plunger already having been fit into the spring receiving sleeve 14. Incidentally, in the foregoing example embodiment, the range pressure signal is for the reverse range pressure, but it is not limited to this. That is, the range pressure signal may be a signal for another range pressure instead.

As described above, the invention is able to provide a regulator valve which enables the rising amount of hydraulic pressure to be regulated to be reduced by increasing the feedback effective pressure receiving area of the line pressure, thereby preventing the gain of the throttle pressure from decreasing so that the necessary line pressure can be ensured. Thus, the invention can provide a regulator valve that can ensure both the feedback effective pressure receiving area and the necessary line pressure while fitting within a limited valve mounting space. Therefore, the invention is useful for a regulator valve provided in a hydraulic control apparatus of an automatic transmission, particularly a regulator valve in general which is suitable for use as a primary regulator valve that controls line pressure.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A regulator valve which constitutes a portion of a hydraulic control apparatus of an automatic transmission, comprising:

a valve body having a valve chamber and a plurality of ports;

a valve spool which is axially displaceably housed in the valve chamber;

a coil spring which is housed in the valve chamber in such a manner as to be interposed between the valve body and the valve spool; and a plunger which is displaceably housed in the valve body, a first end side of the plunger defining a spring chamber that houses the coil spring between the plunger and the valve spool, and a second end side of the plunger receiving a range signal pressure through one of the plurality of ports, wherein the hydraulic pressure discharged from one of the plurality of ports is regulated according to the displacement of the valve spool being urged to a first side in the axial direction by hydraulic pressure to be regulated that is received through another of the plurality of ports, and being urged to a second side in the axial direction by a combination of i) throttle pressure from one of the ports that is directly connected to the spring chamber, ii) spring force from the coil spring corresponding to the displacement of the valve spool, and iii) operating force of the plunger corresponding to the throttle pressure and the range signal pressure, and wherein the plunger has a small diameter portion and a large diameter portion which has a diameter larger than a diameter of the small diameter portion, both of which are axially displaceably retained in the valve body, the small diameter portion is urged to the first side in the axial direction at a first end side which faces the valve spool, and the large diameter portion is urged to the second side in the axial direction by the range signal pressure at a second end side which is isolated from the small diameter portion located in the spring chamber.

2. The regulator valve according to claim 1, wherein:

the plurality of ports of the valve body include a feedback pressure port, a supply pressure port, a drain port, and a regulated pressure output port, as well as a throttle pressure port to which the throttle pressure is supplied, and a range signal pressure port to which the range signal pressure is supplied; and the valve spool is displaced in the axial direction to selectively connect the supply pressure port with the regulated pressure output port or the drain port by being urged to the one side in the axial direction by the hydraulic pressure to be regulated that is received through the feedback pressure port at a first end side, and being urged to the second side in the axial direction by receiving, at a second end side, the combination of i) the throttle pressure inside the spring chamber, ii) the spring force from the coil spring corresponding to the displacement of the valve spool, and iii) the operating force of the plunger corresponding to the throttle pressure and the range signal pressure.

3. The regulator valve according to claim 1, wherein:
the valve spool has a first land portion that receives the hydraulic pressure to be regulated;
a pressure receiving are of the large diameter portion of the plunger that receives the range signal pressure is smaller than a pressure receiving are of the first land portion that receives the hydraulic pressure to be regulated;
the valve spool has a second land portion that receives the throttle pressure in the spring chamber;
a pressure receiveing area of the small diameter portion of the plunger that receives the throttle pressure is smaller than a pressure receiving area of the second land portion that receives the throttle pressure; and
the pressure receiving area of the second land portion that receives the throttle pressure is larger than the pressure receiving area of the first land portion that receiving the hydraulic pressure to be regulated.

4. The regulator valve according to claim 1, wherein the range signal pressure is a reverse range signal pressure.

5. The regulator valve according to claim 1, wherein:
the valve spool has a first land portion that receives the hydraulic pressure to be regulated; and
a pressure receiving area of the large diameter portion of the plunger that receives the range signal pressure is smaller than a pressure receiving area of the first land portion that receives the hydraulic pressure to be regulated.

6. The regulator valve according to claim 5, further comprising:
a sleeve-shaped spring receiving member that is housed inside the spring chamber in such a manner as to be interposed between the coil spring and the valve body,
wherein the spring receiving member is formed of a first inside diameter portion that axially displaceably retains the small diameter portion of the plunger, and a second inside diameter portion that axially displaceably supports the large diameter portion of the plunger; and
wherein a drain passage which opens into a space between the spring receiving member and the plunger is formed between the first inside diameter portion and the second inside diameter portion.

7. The regulator valve according to claim 1, wherein:
the valve spool has a second land portion that receives the throttle pressure in the spring chamber; and
a pressure receiving area of the small diameter portion of the plunger that receives the throttle pressure is smaller than a pressure receiving area of the second land portion that receives the throttle pressure.

8. The regulator valve according to claim 7, further comprising:
a sleeve-shaped spring receiving member that is housed inside the spring chamber in such a manner as to be interposed between the coil spring and the valve body,
wherein the spring receiving member is formed of a first inside diameter portion that axially displaceably retains the small diameter portion of the plunger, and a second inside diameter portion that axially displaceably supports the large diameter portion of the plunger; and
wherein a drain passage which opens into a space between the spring receiving member and the plunger is formed between the first inside diameter portion and the second inside diameter portion.

9. The regulator valve according to claim 1, wherein:
the valve spool has a first land portion that receives the hydraulic pressure to be regulated;
the valve spool has a second land portion that receives the throttle pressure in the spring chamber; and
a pressure receiving area of the second land portion that receives the throttle pressure is larger than a pressure receiving area of the first land portion that receives the hydraulic pressure to be regulated.

10. The regulator valve according to claim 9, further comprising:
a sleeve-shaped spring receiving member that is housed inside the spring chamber in such a manner as to be interposed between the coil spring and the valve body,
wherein the spring receiving member is formed of a first inside diameter portion that axially displaceably retains the small diameter portion of the plunger, and a second inside diameter portion that axially displaceably supports the large diameter portion of the plunger; and
wherein a drain passage which opens into a space between the spring receiving member and the plunger is formed between the first inside diameter portion and the second inside diameter portion.

11. The regulator valve according to claim 1, further comprising:
a sleeve-shaped spring receiving member that is housed inside the spring chamber in such a manner as to be interposed between the coil spring and the valve body,
wherein the spring receiving member is formed of a first inside diameter portion that axially displaceably retains the small diameter portion of the plunger, and a second inside diameter portion that axially displaceably supports the large diameter portion of the plunger; and
wherein a drain passage which opens into a space between the spring receiving member and the plunger is formed between the first inside diameter portion and the second inside diameter portion.

12. The regulator valve according to claim 11, wherein a diameter of the first inside diameter portion is smaller than the diameter of the large diameter portion.

* * * * *